(12) United States Patent
Oki et al.

(10) Patent No.: US 9,573,406 B2
(45) Date of Patent: Feb. 21, 2017

(54) INFORMATION PROCESSING APPARATUS, METHOD OF CONTROLLING THE SAME, AND NON-TRANSITORY COMPUTER-READABLE MEDIUM

(71) Applicant: CANON KABUSHIKI KAISHA, Tokyo (JP)

(72) Inventors: Mitsuo Oki, Kawasaki (JP); Kenichiro Uotani, Ichikawa (JP); Yuki Uchida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 459 days.

(21) Appl. No.: 14/287,820

(22) Filed: May 27, 2014

(65) Prior Publication Data

US 2014/0356103 A1 Dec. 4, 2014

(30) Foreign Application Priority Data

May 29, 2013 (JP) ................................ 2013-113170

(51) Int. Cl.
| | |
|---|---|
| *G03G 21/14* | (2006.01) |
| *G03G 21/00* | (2006.01) |
| *B41J 29/38* | (2006.01) |
| *G06F 3/12* | (2006.01) |
| *B42C 19/02* | (2006.01) |

(52) U.S. Cl.
CPC ............ *B42C 19/02* (2013.01); *G06F 3/1217* (2013.01); *G06F 3/1275* (2013.01); *G06F 3/1282* (2013.01)

(58) Field of Classification Search
CPC ......... G03G 21/14; G03G 21/00; B41J 29/38; G06F 3/12; G06F 3/1282; G06F 3/1275; G06F 3/1217; B42C 19/02; H04N 1/00
See application file for complete search history.

(56) References Cited

U.S. PATENT DOCUMENTS

| | | | | |
|---|---|---|---|---|
| 8,218,170 | B2 * | 7/2012 | Klopsch ................ | G06F 3/1211 358/1.15 |
| 8,634,731 | B2 * | 1/2014 | Has ....................... | G06F 3/1204 358/1.15 |

(Continued)

FOREIGN PATENT DOCUMENTS

JP          2011-244158 A      12/2011

*Primary Examiner* — Nguyen Ha
(74) *Attorney, Agent, or Firm* — Rossi, Kimms & McDowell LLP

(57) ABSTRACT

An information processing apparatus comprises a deciding unit which decides on a sequence for manufacturing a plurality of products using the type information of a plurality of products; and a unit which causes a print apparatus and a post-pressing apparatus to manufacture the plurality of products in accordance with the sequence decided on, wherein the deciding unit decides on the sequence such that products of the same type are manufactured consecutively by the print apparatus and the post-pressing apparatus, and furthermore, for each type of product, the deciding unit decides on the sequence using step information regarding steps for product manufacturing such that, among steps for manufacturing a plurality of parts that constitute each of the plurality of products of the same type that are consecutive in the print apparatus, steps for manufacturing the same type of part are consecutive.

7 Claims, 11 Drawing Sheets

(56) References Cited

U.S. PATENT DOCUMENTS

2005/0050466 A1* 3/2005 Sangroniz ............ G06F 3/1205
 715/273
2009/0015860 A1* 1/2009 Jahn ....................... G06Q 10/06
 358/1.15

* cited by examiner

FIG. 4

| ORDER INFORMATION | | | | STEP INFORMATION | | |
|---|---|---|---|---|---|---|
| | | | | PRESS STEP | | POST-PRESS STEP |
| ORDER NUMBER | PRODUCT NUMBER | PRODUCT TYPE | PRODUCT GROUP NUMBER | STATUS | PART JOB (STEP) | JOB ISSUANCE DESTINATION | STEP LINE |
| 0001 | 0001 | PERFECT BINDING_8×8 | — | PRE-MANUFAC-TURING | COVER PRINT JOB 1 | FIRST COVER PRINTER | LINE B |
| | | | | | BODY PRINT JOB 1 | FIRST BODY PRINTER | |
| | | | | | CASE BINDING JOB 1 | FIRST CASE BINDER | |
| 0002 | 0002 | TWO-FOLD PASTED PAGE_8×12 | — | PRE-MANUFAC-TURING | COVER PRINT JOB 1 | FIRST COVER PRINTER | LINE A |
| | | | | | BODY PRINT JOB 1 | FIRST BODY PRINTER | |
| 0003 | 0003 | TWO-FOLD PASTED PAGE_8×12 | — | PRE-MANUFAC-TURING | COVER PRINT JOB 2 | FIRST COVER PRINTER | LINE A |
| | | | | | BODY PRINT JOB 2 | FIRST BODY PRINTER | |
| 0004 | 0004 | PERFECT BINDING_8×8 | — | PRE-MANUFAC-TURING | COVER PRINT JOB 2 | FIRST COVER PRINTER | LINE B |
| | | | | | BODY PRINT JOB 2 | FIRST BODY PRINTER | |
| | | | | | CASE BINDING JOB 2 | FIRST CASE BINDER | |

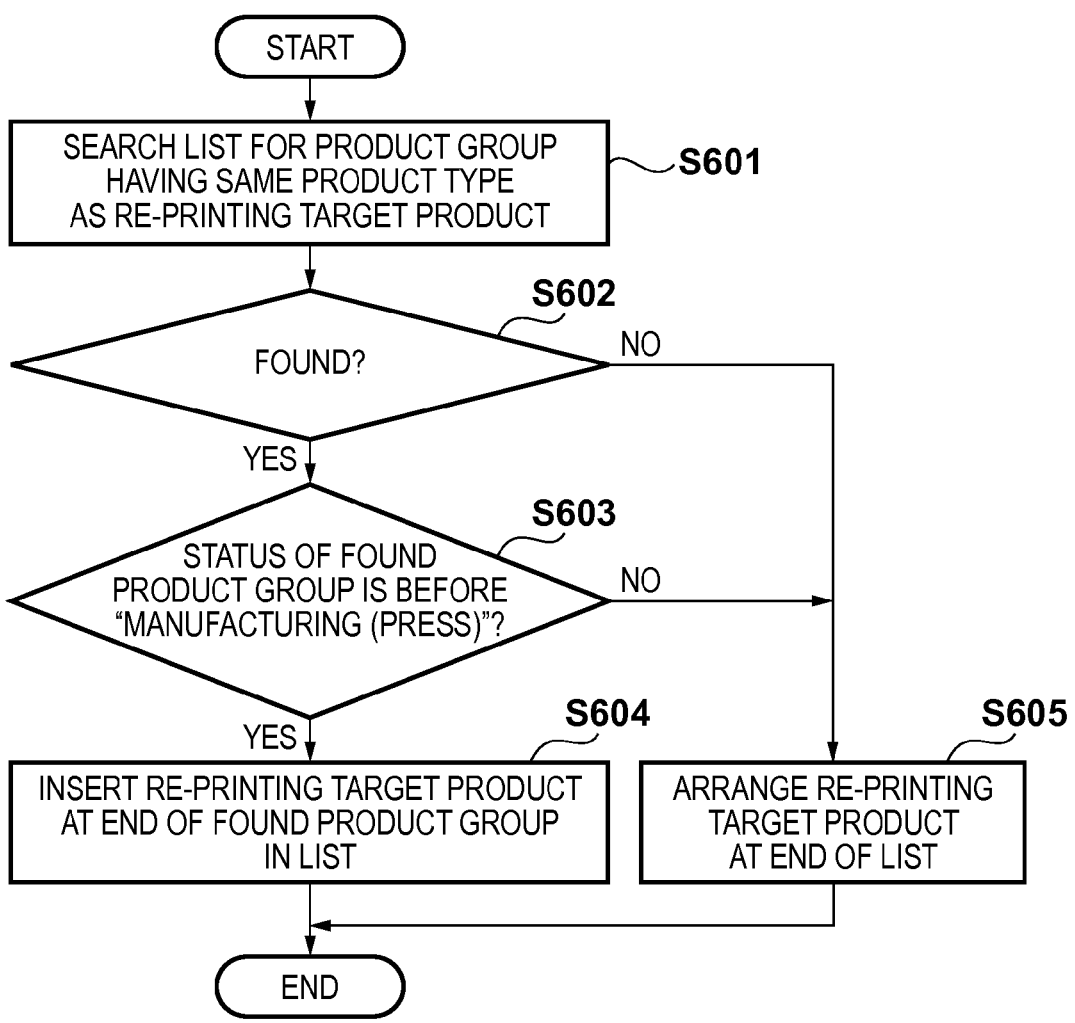

FIG. 7

| ORDER INFORMATION | | | | STEP INFORMATION | | | |
|---|---|---|---|---|---|---|---|
| | | | | PRESS STEP | | | POST-PRESS STEP |
| ORDER NUMBER | PRODUCT NUMBER | PRODUCT TYPE | PRODUCT GROUP NUMBER | STATUS | PART JOB (STEP) | JOB ISSUANCE DESTINATION | STEP LINE |
| 0001 | 0001 | PERFECT BINDING_8×8 | 00000001 | PRE-MANUFACTURING | COVER PRINT JOB 1 | FIRST COVER PRINTER | LINE B |
| 0004 | 0004 | | | PRE-MANUFACTURING | COVER PRINT JOB 2 | FIRST COVER PRINTER | |
| 0001 | 0001 | | | PRE-MANUFACTURING | BODY PRINT JOB 1 | FIRST BODY PRINTER | |
| 0004 | 0004 | | | PRE-MANUFACTURING | BODY PRINT JOB 2 | FIRST BODY PRINTER | |
| 0001 | 0001 | | | PRE-MANUFACTURING | CASE BINDING JOB 1 | FIRST CASE BINDER | |
| 0004 | 0004 | | | PRE-MANUFACTURING | CASE BINDING JOB 2 | FIRST CASE BINDER | |
| 0002 | 0002 | TWO-FOLD PASTED PAGE_ 8×12 | 00000002 | PRE-MANUFACTURING | COVER PRINT JOB 1 | FIRST COVER PRINTER | LINE A |
| 0003 | 0003 | | | PRE-MANUFACTURING | COVER PRINT JOB 2 | FIRST COVER PRINTER | |
| 0002 | 0002 | | | PRE-MANUFACTURING | BODY PRINT JOB 1 | FIRST BODY PRINTER | |
| 0003 | 0003 | | | PRE-MANUFACTURING | BODY PRINT JOB 2 | FIRST BODY PRINTER | |

FIG. 8

| ORDER NUMBER 801 | PRODUCT NUMBER 802 | PRODUCT TYPE 803 | PRODUCT GROUP NUMBER 804 | STATUS 805 |
|---|---|---|---|---|
| 001 | 001 | PERFECT BINDING_8×8 | 00000001 | INSPECTION COMPLETE |
| 002 | 002 | PERFECT BINDING_8×8 | 00000001 | INSPECTION COMPLETE |
| 004 | 004 | PERFECT BINDING_8×8 | 00000001 | INSPECTION COMPLETE |
| 009 | 009 | SINGLE-LEAF PHOTOGRAPH_4×6 | 00000002 | MANUFACTURING COMPLETE |
| 005 | 005 | SINGLE-PAGE PASTED PAGE_8×12 | 00000003 | PRE-MANUFACTURING |
| 007 | 007 | SINGLE-PAGE PASTED PAGE_8×12 | 00000003 | PRE-MANUFACTURING |
| 003 | 003 | TWO-FOLD PASTED PAGE_8×12 | 00000004 | PRE-MANUFACTURING |
| 008 | 008 | TWO-FOLD PASTED PAGE_8×12 | 00000004 | PRE-MANUFACTURING |
| 006 | 006 | TWO-FOLD PASTED PAGE_8×12 | 00000004 | PRE-MANUFACTURING |

800, 806, 807

| ORDER NUMBER | PRODUCT NUMBER | PRODUCT TYPE | PRODUCT GROUP NUMBER | STATUS |
|---|---|---|---|---|
| 020 | 020 | SINGLE-PAGE PASTED PAGE_8×12 | 00000020 | MANUFACTURING COMPLETE |

808

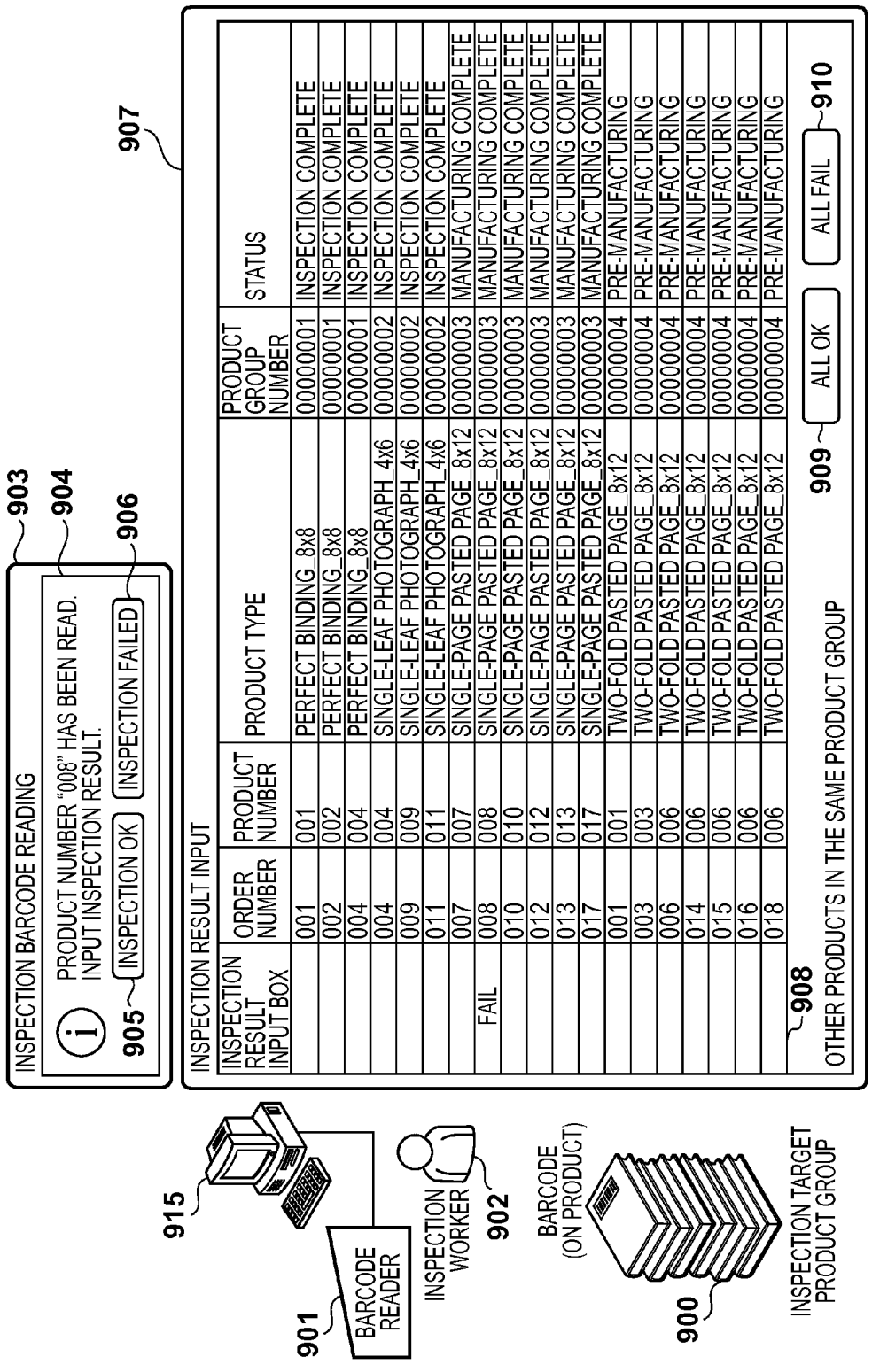

FIG. 9B

INSPECTION RESULT INPUT — 911

| INSPECTION RESULT INPUT BOX | ORDER NUMBER | PRODUCT NUMBER | PRODUCT TYPE | PRODUCT GROUP NUMBER | STATUS |
|---|---|---|---|---|---|
|  | 001 | 001 | PERFECT BINDING_8x8 | 00000001 | INSPECTION COMPLETE |
|  | 002 | 002 | PERFECT BINDING_8x8 | 00000001 | INSPECTION COMPLETE |
|  | 004 | 004 | PERFECT BINDING_8x8 | 00000001 | INSPECTION COMPLETE |
|  | 004 | 004 | SINGLE-LEAF PHOTOGRAPH_4x6 | 00000002 | INSPECTION COMPLETE |
|  | 009 | 009 | SINGLE-LEAF PHOTOGRAPH_4x6 | 00000002 | INSPECTION COMPLETE |
|  | 011 | 011 | SINGLE-LEAF PHOTOGRAPH_4x6 | 00000002 | INSPECTION COMPLETE |
| OK | 007 | 007 | SINGLE-PAGE PASTED PAGE_8x12 | 00000003 | MANUFACTURING COMPLETE |
| FAIL | 008 | 008 | SINGLE-PAGE PASTED PAGE_8x12 | 00000003 | MANUFACTURING COMPLETE |
| OK | 010 | 010 | SINGLE-PAGE PASTED PAGE_8x12 | 00000003 | MANUFACTURING COMPLETE |
| OK | 012 | 012 | SINGLE-PAGE PASTED PAGE_8x12 | 00000003 | MANUFACTURING COMPLETE |
| OK | 013 | 013 | SINGLE-PAGE PASTED PAGE_8x12 | 00000003 | MANUFACTURING COMPLETE |
| OK | 017 | 017 | SINGLE-PAGE PASTED PAGE_8x12 | 00000003 | MANUFACTURING COMPLETE |
|  | 001 | 001 | TWO-FOLD PASTED PAGE_8x12 | 00000004 | PRE-MANUFACTURING |
|  | 003 | 003 | TWO-FOLD PASTED PAGE_8x12 | 00000004 | PRE-MANUFACTURING |
|  | 006 | 006 | TWO-FOLD PASTED PAGE_8x12 | 00000004 | PRE-MANUFACTURING |
|  | 014 | 006 | TWO-FOLD PASTED PAGE_8x12 | 00000004 | PRE-MANUFACTURING |
|  | 015 | 006 | TWO-FOLD PASTED PAGE_8x12 | 00000004 | PRE-MANUFACTURING |
|  | 016 | 006 | TWO-FOLD PASTED PAGE_8x12 | 00000004 | PRE-MANUFACTURING |
|  | 018 | 006 | TWO-FOLD PASTED PAGE_8x12 | 00000004 | PRE-MANUFACTURING |

912 — OTHER PRODUCTS IN THE SAME PRODUCT GROUP

913 — ALL OK    914 — ALL FAIL

INFORMATION PROCESSING APPARATUS, METHOD OF CONTROLLING THE SAME, AND NON-TRANSITORY COMPUTER-READABLE MEDIUM

BACKGROUND OF THE INVENTION

Field of the Invention

The present invention relates to an information processing apparatus, a method of controlling the same, and a non-transitory computer-readable medium.

Description of the Related Art

Conventionally, there are print order services for so-called photobooks or the like by which a user creates a book composed of multiple pages by freely arranging image data with respect to a predetermined layout, and orders it via a network. When the user places an order, order information and laid-out content data are transmitted to a production base, and the product is made according to the order.

The production step needed at the production base is constituted by a plurality of work steps. Also, the combination of the work steps and the processing content of the steps differ depending on the type of the book. Also, one book is constituted by a combination of multiple parts such as a cover, a main body (body), and the like.

With this kind of service, there are many cases of different users each placing small orders of different types of books instead of basically a specific user ordering a large amount of books with the same content, or in other words, small-lot high-mix production is used. From the point of view of the manufacturing base, orders from users are for random product types, and therefore if they are brought to the production step in the order they were ordered, the production sequence of the parts constituting the products will be random as well, and there will be a problem in that the production efficiency of the entire production base will deteriorate significantly.

With a production base for a product at which it is presumed that multiple types of products will be produced, in the interest of the human resource cost relative to the product price as well as setting the delivery date to the user, what is important is how much the productivity can be improved based on the entire configuration rather than the productivity of each product or constituent part.

In order to resolve these problems, a production step design is desirable which takes into consideration making products of the same type consecutive in each work step at the time of starting production. Conventionally, after the user inputs an order, the operation side responds with an operator manually performing grouping by the same product type before starting production, and thereafter repeating the manufacturing for the same product type at a fixed time. Also, in Japanese Patent Laid-Open No. 2011-244158, an execution sequence is controlled based on the attributes of the sheet designated for the job such that print jobs that use sheets supplied from the same paper feeding tray are executed consecutively.

Since Japanese Patent Laid-Open Mo. 2011-244158 only takes into consideration the optimization of press processing, it does not take into consideration the overall workflow of the production base, including various types of steps other than the press step. Also, Japanese Patent Laid-Open No. 2011-244158 does not take into consideration the actual sequence control between parts.

SUMMARY OF THE INVENTION

In view of the aforementioned problems, the present invention provides a system that can perform control in which the continuity of products of the same type is ensured in the steps, in consideration of optimizing the steps in the production of multiple product types.

According to one aspect of the present invention, there is provided an information processing apparatus comprising: an obtaining unit configured to obtain type information of a plurality of products to be manufactured using a print apparatus and a post-pressing apparatus; a sequence deciding unit configured to decide on a sequence for manufacturing the plurality of products using the type information of the plurality of products; and a control unit configured to cause the print apparatus and the post-pressing apparatus to manufacture the plurality of products in accordance with the sequence decided on by the sequence deciding unit, wherein a plurality of steps for product manufacturing are different for each type of product, and the sequence deciding unit decides on the sequence such that products of the same type are manufactured consecutively by the print apparatus and the post-pressing apparatus, and furthermore, for each type of product, the sequence deciding unit decides on the sequence using step information regarding a plurality of steps for product manufacturing such that, among steps for manufacturing a plurality of parts that constitute each of the plurality of products of the same type that are consecutive in the print apparatus, steps for manufacturing the same type of part are consecutive.

According to another aspect of the present invention, there is provided a method for an information processing apparatus, comprising: obtaining type information of a plurality of products to be manufactured using a print apparatus and a post-pressing apparatus; deciding on a sequence for manufacturing the plurality of products using the type information of the plurality of products; and causing the print apparatus and the post-pressing apparatus to manufacture the plurality of products in accordance with the sequence decided on in the deciding step, wherein a plurality of steps for product manufacturing are different for each type of product, and in the deciding step, the sequence is decided on such that products of the same type are manufactured consecutively by the print apparatus and the post-pressing apparatus, and the sequence is furthermore decided on for each type of product using step information regarding a plurality of steps for product manufacturing such that, among steps for manufacturing a plurality of parts that constitute each of the plurality of products of the same type that are consecutive in the print apparatus, steps for manufacturing the same type of part are consecutive.

According to another aspect of the present invention, there is provided a non-transitory computer-readable medium storing a program for causing a computer to function as: an obtaining unit configured to obtain type information of a plurality of products manufactured using a print apparatus and a post-pressing apparatus; a sequence deciding unit configured to decide on a sequence for manufacturing the plurality of products using the type information of the plurality of products; and a control unit configured to cause the print apparatus and the post-pressing apparatus to manufacture the plurality of products in accordance with the sequence decided on by the sequence deciding unit, wherein a plurality of steps for product manufacturing are different for each type of product, and the sequence deciding unit decides on the sequence such that products of the same type are manufactured consecutively by the print apparatus and the post-pressing apparatus, and furthermore, for each type of product, the sequence deciding unit decides on the sequence using step information regarding a plurality of steps for product manufacturing such that, among steps for manufacturing a plurality of parts that constitute each of the plurality of products of the same type that are consecutive in the print apparatus, steps for manufacturing the same type of part are consecutive.

According to the present invention, in the case of producing multiple product types by means of multiple work steps, the continuity of the same product type is ensured in the work steps, and the production workflow can be executed more efficiently.

Further features of the present invention will become apparent from the following description of an exemplary embodiment with reference to the attached drawings.

BRIEF DESCRIPTION OF THE DRAWINGS

FIG. 4 is a diagram showing an example of order information and step information.

FIG. 6 is a flowchart showing an example of manufacturing sequence deciding processing performed when re-printing.

FIG. 7 is a diagram showing an example of order information and step information resulting from production sequence deciding processing.

FIG. 8 is a diagram showing an example of order information and step information resulting from manufacturing sequence deciding processing performed when re-printing.

FIGS. 9A and 9B are diagrams showing an example of processing in an inspection step and screens on the order management apparatus.

DESCRIPTION OF THE EMBODIMENTS

Problems in Steps

First, examples of specific problems in each work step constituting the product manufacturing step will be described below.

Press Step

In a press step, which is a print step, roll paper is used in a printer for product, production, and therefore the following problem occurs.

(1) If the continuity of print jobs having the same condition such as the same sheet type and same sheet size can no longer be ensured, the paper supply rolls corresponding to the parts need to be exchanged. Similarly, the positions of the paper supply rolls in a printer in which multiple paper supply rolls are installed will need to be switched. For this reason, consecutive printing of the roll sheet is interrupted, whereby the printing efficiency per unit time deteriorates.

(2) Depending on the limitations of the printer, paper waste that is a non-print region is sometimes generated before and after exchanging the paper supply roll, and because of this, the paper waste rate increases, which leads to an increase in production cost.

Post-Press Step

In a post-press step, which is a bookbinding task serving as a post-pressing step, part movement between steps and a portion of processing in the steps has generally been carried out with human intervention. For this reason, in the production of random types of parts, the virtual production line is switched. As a result, productivity per unit time deteriorates. Note that the switching of the virtual production line here refers to switching the configuration or settings so as to match the product (part) that is to be manufactured by the same post-pressing apparatus.

Inspection Step

An inspection step is a step in which a worker visually checks for page damage and checks the overall bookbinding finish for the completed bound item and makes a pass or fail determination, and it is common to check different locations and items with a focus on different points for each type of product. For this reason, if the continuity of products of the same type cannot be ensured, the productivity per unit time will deteriorate.

Re-Printing Step

In the case of making a fail determination in the inspection step, it is often necessary to perform production of all constituent parts once again starting from the press step. However, if the press step for a product of another type is already being implemented at that time and then the re-printing job is simply interrupted, there is a risk that the continuity of the product will be unintentionally disrupted in the case where the product type that is already in the press step is being produced while keeping continuity.

Embodiment

The present invention has a configuration that takes into consideration the aforementioned problems in the steps. An exemplary mode for implementing the present invention will be described below with reference to the drawings.

System Configuration

Figure 1:
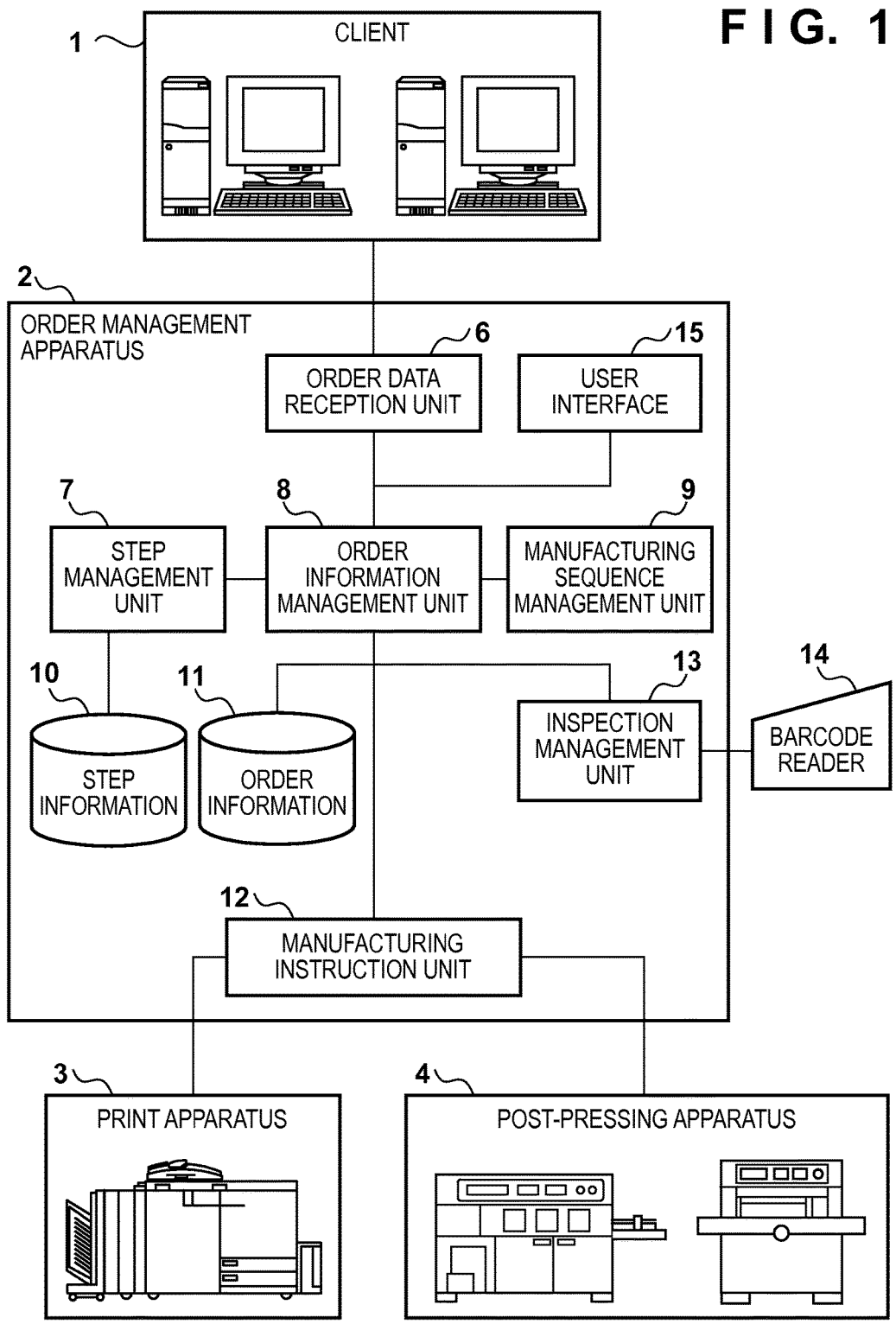
FIG. 1 is a block diagram showing an example of a configuration of a system according to the present invention.

FIG. 1 shows an example of an overall system configuration according to the present invention. This system is largely constituted by a client 1, an order management, apparatus 2, a print apparatus 3, and a post-pressing apparatus 4. The client 1 is an environment in which a user selects, edits, and orders a layout for a product via a service provided by the order management apparatus 2. When the user completes layout editing for a product and places the order, the client 1 generates order information regarding the product created by the user. Order information is data that includes information regarding the ordered product, and that information differs depending on the content of the order placed by the user. One or more clients 1 exist in the system and are connected to the order management apparatus 2 using a network such as the Internet.

The order management apparatus 2 receives order information from the client 1 and controls management of order information and the output thereof to the print apparatus 3 and the post-pressing apparatus 4. The order management apparatus 2 controls the sequence of executing the manufacturing steps for the product that is to be manufactured, and performs step management. The order management apparatus 2 includes an order data reception unit 6, a step management unit 7, an order information management, unit 8, a manufacturing sequence management unit 9, a manufacturing instruction unit 12, an inspection management unit 13, a barcode reader 14, and a user interface 15.

The print apparatus 3 interprets, rasterizes, and prints jobs transmitted from the order management apparatus 2 via the manufacturing instruction unit 12. The post-pressing apparatus 4 interprets post-pressing jobs transmitted from the order management apparatus 2 via the manufacturing instruction unit 12, sets post-pressing parameters, and subjects a printed object printed by the print apparatus 3 to post-pressing when the printed object has been set. Case bookbinders, trimmers, creasers, laminators, and the like are examples of types of post-pressing apparatuses 4.

An internal configuration of the order management apparatus 2 will be described next in detail. The order data reception unit 6 receives content data such as order information and image data for the product from the client 1. Here, order information and content data will be collectively referred to as order data. Step information is defined in advance according to the product type that can be included in the orders, and the step management unit 7 holds this step information in the step information 10 and manages it. Here, it is presumed that there are multiple types of products. The order information management unit 8 uses order information received by the order data reception unit 6 and step information managed by the step management unit 7 to manage the steps needed in the manufacturing of the resulting object (product) corresponding to the order data. Also, the order information management unit 8 makes a request to the manufacturing instruction unit 12 to issue a print job and a processing job, in accordance with the product manufacturing sequence decided on by the manufacturing sequence management unit 9. The manufacturing sequence deciding method used by the manufacturing sequence management unit 9 will be described later with reference to FIG. 5.

The user interface 15 is a graphic interface that allows an administrator to display a list of order information, execute, and perform various settings. After the manufacturing of the product is complete and has been inspected, the inspection management unit 13 identifies the product by reading a barcode printed on the product using the barcode reader 14. Furthermore, the inspection management unit 13 manages the inspection result of the orders by receiving input of the inspection result from the administrator using the user interface 15. The manufacturing instruction unit 12 includes a function of obtaining capability information and configuration information from the print apparatus 3 and the post-pressing apparatus 4, as well as a function of transmitting print jobs to the print apparatus 3 and transmitting post-pressing jobs to the post-pressing apparatus 4.

Hardware Configuration

Figure 2:
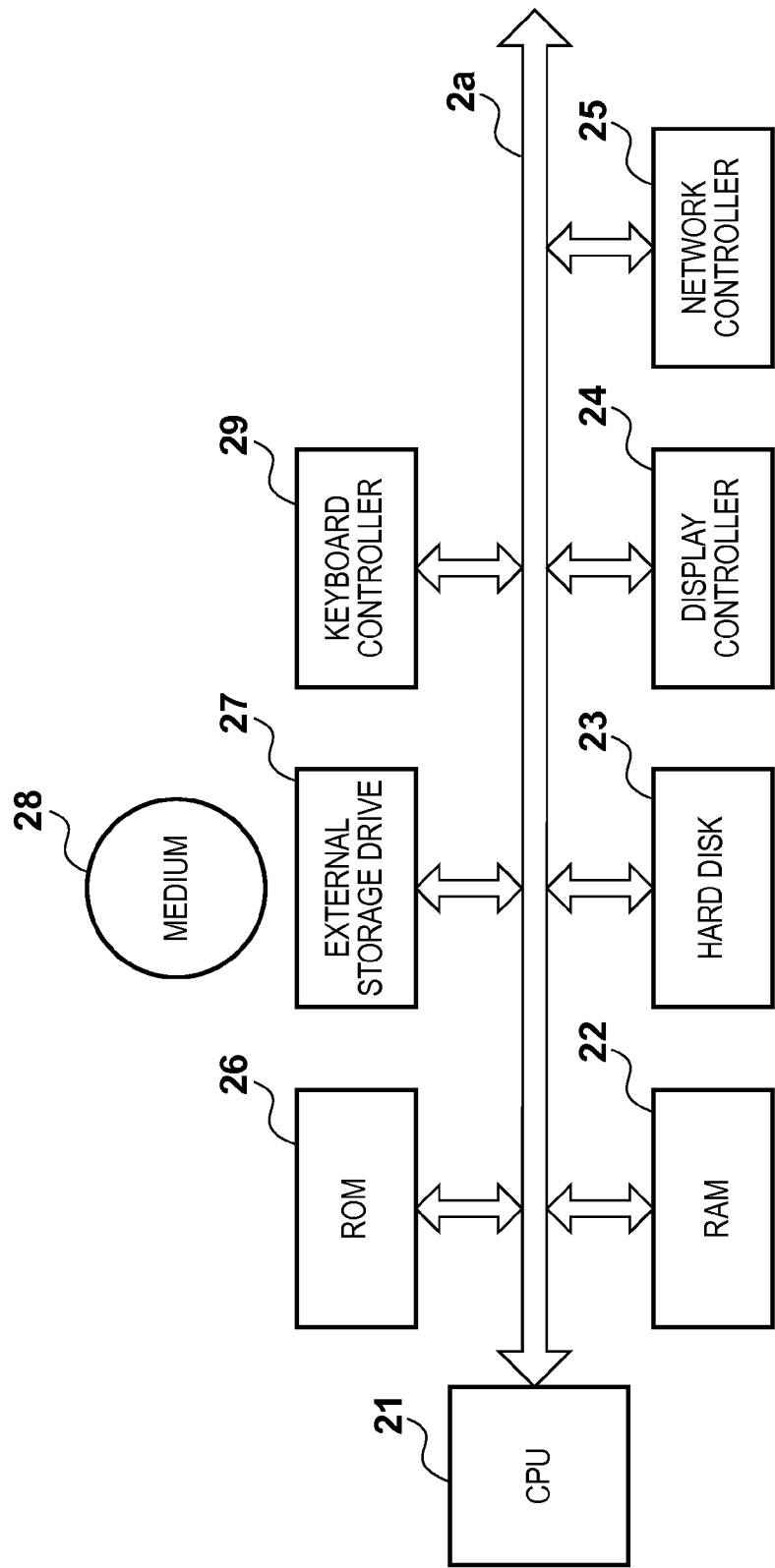
FIG. 2 is a block diagram showing an example of a hardware configuration of an information processing apparatus.

FIG. 2 shows an example of the internal hardware configuration of the order management apparatus 2. A CPU 21 executes programs such as programs stored in a program region in a ROM 26, an OS loaded from a hard disk 23 to a RAM 22, general use applications, or the like. The RAM 22 functions as a main memory, a work area, and the like for the CPU 21. The hard disk 23 stores a boot program, various applications, font data, user files, electronic manuscript files, and the like.

Also, all order data received by the order management apparatus 2 is sent to the hard disk 23. A display controller 24 performs control of display performed by a display. A network controller 25 executes processing for controlling communication with other devices connected to the network. An external storage drive 27 reads information from a medium 28 such as a CD or a DVD. A keyboard controller 29 controls key input from a keyboard and a pointing device. Also, the CPU 21 is connected to these blocks by means of an internal bus 2a. Note that in the present embodiment, the client 1 is described as having a similar hardware configuration as well.

Task Workflow

Figure 3A:
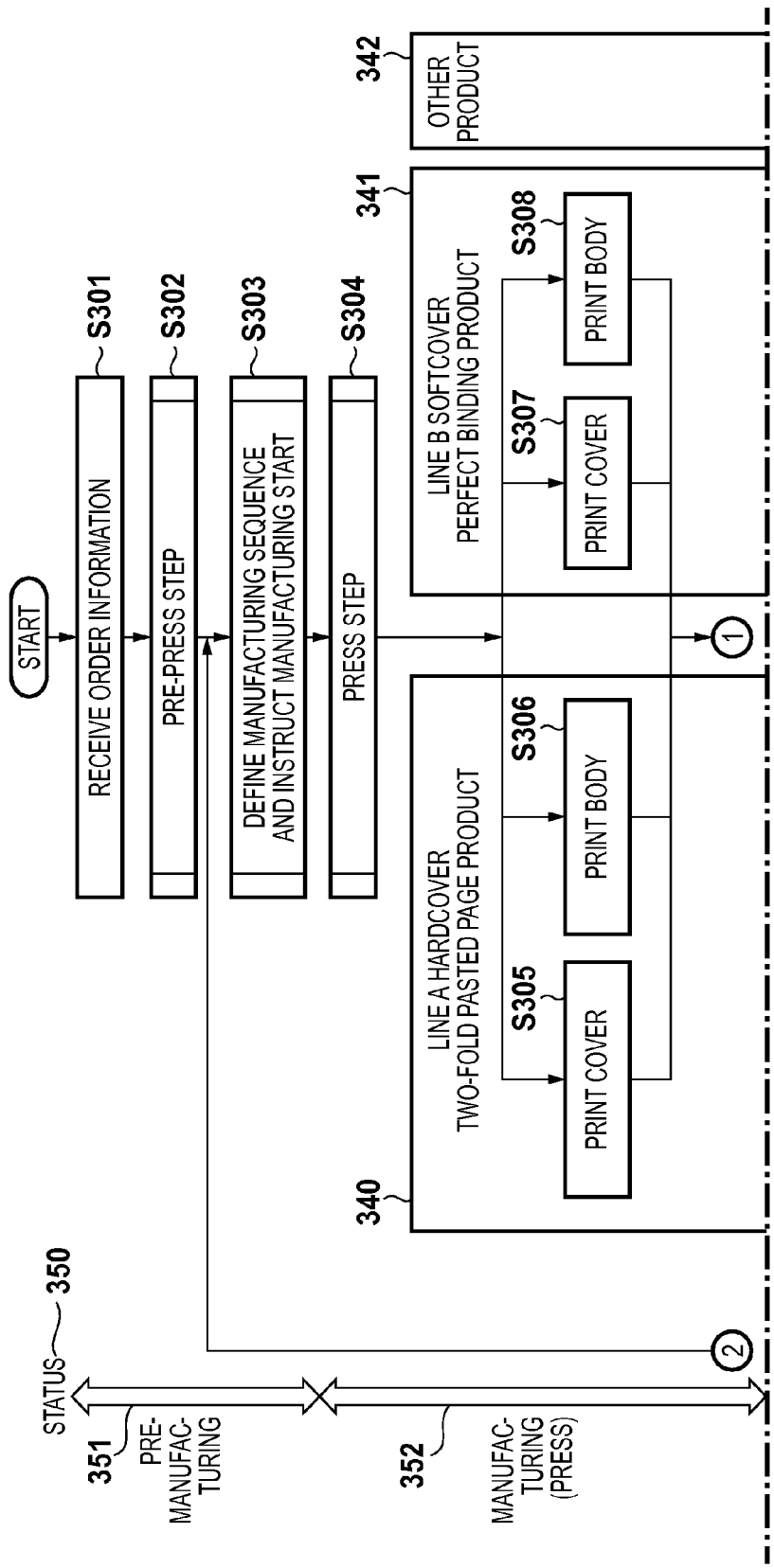
FIGS. 3A and 3B are diagrams showing an example of a workflow for producing a series of products, executed by a production base.
Figure 3B:
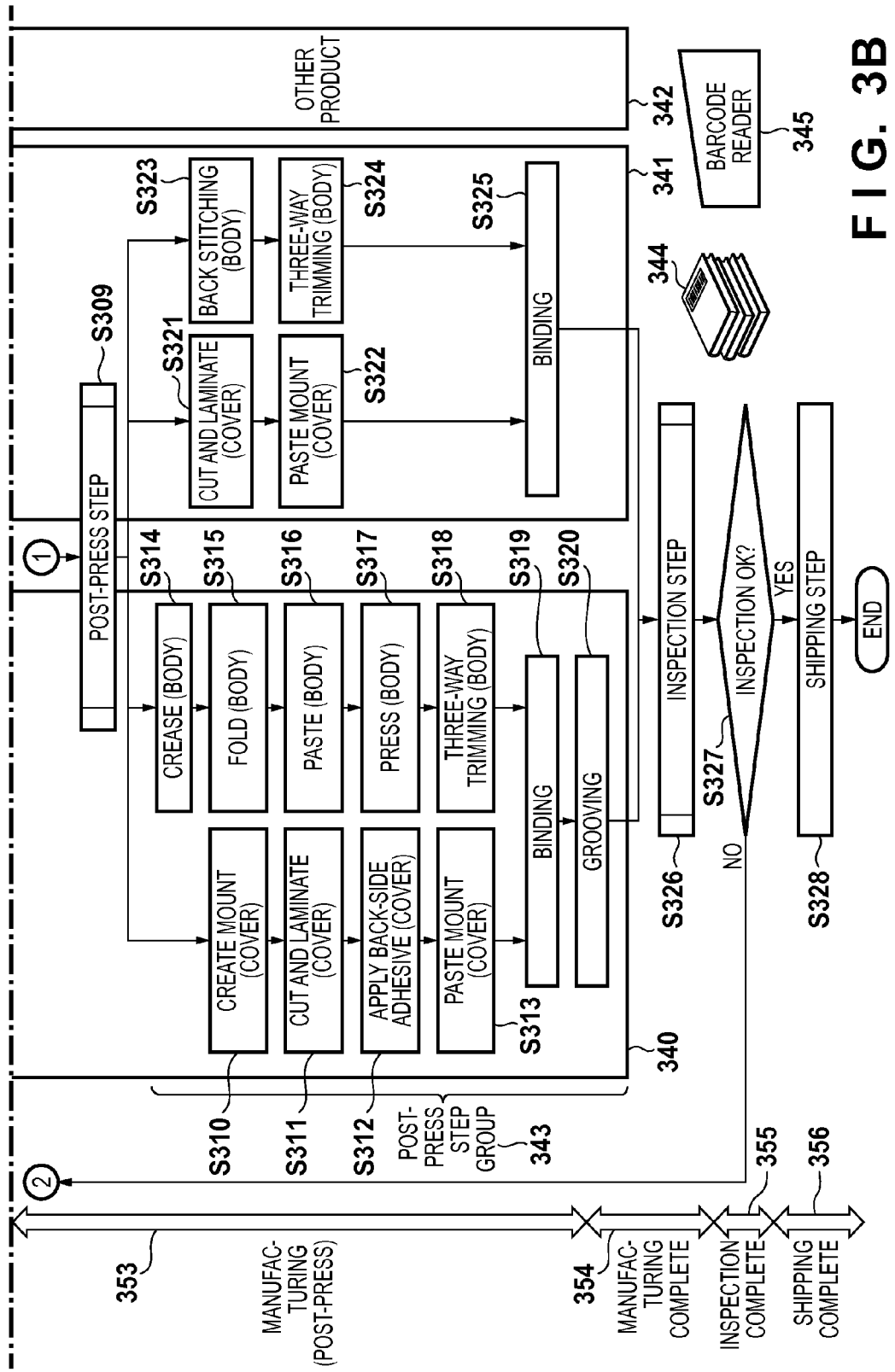

FIGS. 3A and 3B show an example of a task workflow for a series of processes up to the completion of the product in the production base managed by the order management apparatus 2 shown in FIG. 2. FIGS. 3A and 3B represent a task workflow series from step S301 to step S328. Also, status 350 indicates the production status of the orders in the workflow at the production base.

When processing is started, in step S301, the order management apparatus 2 receives order information transmitted by the client 1. Here, order information is received at an arbitrary timing. Specifically, it is thought that successive reception is performed according to the timing at which the users placed the orders, that multiple orders placed before an arbitrary time, such as the time of starting work at the production base, are received as a batch, or the like.

In step S302, the order management apparatus 2 performs a pre-press step that is needed for the product corresponding to the received order information. In the pre-press step, with respect to the layout editing for the product, edited by the user, the cut position and centering position that will be needed in the post-press step are additionally rendered in the content data using a rendering of a crop mark. In addition to that, in the pre-press step, processing for adjusting the layout image position giving consideration to a cut intersection referred to as a "bleed" that is needed in the post-press step is performed. Furthermore, in the pre-press step, processing for rendering a barcode for managing the product in the production base is performed. Here, the barcode rendering defines various codes using the display standard of the barcode as a reference, and one-dimensional and two-dimensional barcodes and the like are rendered in accordance with the display standard employed by the production base. Note that in the present embodiment, product management by means of barcode is given as an example, but there is no limitation to using a barcode, and a system of managing the product by means of numeric values, character strings, or the like may be used.

In step S303, the order management apparatus 2 performs processing for defining the manufacturing sequence according to the present invention for multiple pieces of received order information. A detailed processing flow for step S303 will be described later with reference to FIG. 5. After the manufacturing sequence definition processing, the order management apparatus 2 gives a manufacturing start instruction. Note that the manufacturing start instruction for the product may be explicitly given manually by the administrator of the production base, or the manufacturing start instruction for the product may be given automatically after the manufacturing sequence definition processing.

In step S304, the order management apparatus 2 executes the press step (print processing). Here, the manufacturing instruction unit 12 issues a print job to the printer defined by the step information 10, using the content data resulting from pre-press processing with respect to the order data. In the present example, a line A hardcover two-fold pasted page product 340, and a line B softcover perfect binding product 341 are given as examples and are switched according to the product type in the order data. In FIG. 3A, steps S305 and S306 indicate press processing for the product 340, and steps S307 and S308 indicate press processing for the product 341.

Thus, at the production base, the printer used in the press step according to the product, the print settings used for printing, and the like are commonly defined in advance according to the type of the product and differ for each type of part constituting the product. In the present example, in the case of the product 340, the printing of the content data for the front cover (step S305) and the printing of the content data for the main body (hereinafter referred to as "body") (step S306) are processed by different types of printers. On the other hand, with the product 341, the cover printing (step S307) and the body printing (step S308) are performed using the same type of printer.

Thus, in the press step, processing for printing the step parts of the product, such as the cover and the body is different for each type of product. After the press step, the procedure moves to step S309.

In FIG. 3B, a detailed post-press step group 343 that is carried out in the post-press step (step S309) is shown for each type of product that is to be produced. Creating a mounting for the cover (step S310), cutting and laminating a printed cover object (step S311), applying back-side adhesive for attaching the cover to the mounting (step S312), and attaching the cut and laminated printed object to the cover mounting (step S313) are steps that are needed for the cover of the product 340.

Creasing for correctly folding the center of the body (step S314), folding along the central line (step S315), bonding pages together (step S316), pressing the bonded body to strengthen the folds (step S317), and three-way trimming for the body (step S318) are steps needed for the parts of the body of the product 340.

Then, after the completed cover parts and body parts are bound together in the form of a book (step S319), double-spread grooving for correctly opening the cover part (step S320) is performed, and the manufacturing of the product 340 as one final book is complete. On the other hand, the post-press step group for the product 341 is different in the creation of the cover part, the creation of the body part, and the binding together of those parts, but the description thereof will be omitted here (steps S321 to S325).

In the production base for the product, as in the example shown here, the content, of the post-press step group 343 differs depending on the type of the product that is to be produced. Also, there are cases where a portion of the steps are carried out with human intervention and a portion of the steps are carried out using a post-pressing apparatus 4 for each step. For this reason, it is important to realize an efficient production workflow by arranging the human intervention and the post-step processing apparatuses in a virtual production line combination according to the type of product that is to be produced.

In step S326, after manufacturing is complete, the order management apparatus 2 performs an inspection step for the product that is in the form of a book. The inspection step is a step in which an inspector checks the manufactured product in the interest of determining whether or not the product has been completed without problems and at a certain quality that can be provided to the user. For example, the inspector visually checks for damage to the pages or front cover, printing errors, bookbinding errors, and the like. After checking a certain amount of the same type of product 344, the inspector ultimately notifies the order management apparatus 2 of pass or fail information regarding the product by reading the barcode by which the inspection result is rendered on the product using a barcode reader 345.

In step S327, the order management apparatus 2 determines whether or not the inspection result of the product in the inspection step is a pass. If it is determined that the product has passed the inspection step (YES in step S327), a shipping step (step S328) is performed, and the product is shipped to the user who placed the order. On the other hand, if it is determined that the product has not passed the inspection (NO in step S327), the procedure returns to step S303, the manufacturing sequence of the target-product is defined once again and the manufacturing start instruction is given once again, and thereafter the press step (step S304) and the post-press step (step S309) are carried out once again. This is because it is necessary to re-implement production of the product from the constituent parts (in the present example, the press steps for the cover and the body) since the inspected product has already been bound.

Status 350 indicates the production status of the product in the production base in the workflow series described above. Specifically, the reception of the order information (step S301) to the defining of the manufacturing sequence and the manufacturing start instruction (step S303) is pre-manufacturing status 351, and the press step (step S304) is manufacturing (press) status 352. Furthermore, the post-press step (step S309) is manufacturing (post-press) status 353, and steps after the completion of the post-press step (step S326) are manufacturing complete status 354. Also, after the inspection is complete (after YES in step S327), inspection complete status 355 is entered, and after a shipping step (step S328), shipping complete status 356 is entered.

Note that in the present example, the status is managed in the aforementioned units, but a more detailed or larger unit may be used to manage the status in accordance with the unit and operation of the production step workflow.

Order Information

FIG. 4 is a diagram showing an example of order information managed by the order information management unit 8 in a state in which the order data has been received, and a list of step information corresponding to the orders, in the order management apparatus 2. The list is held in the order management apparatus 2 as order information 11, and is managed by the order information management unit 8. Also, FIG. 4 is a list in a state before the manufacturing sequence is rearranged, or in other words, at a time when the order data has been received in the manufacturing sequence management unit 9.

Order information 401 indicates a breakdown of order information received from the client 1, and each item includes an order number 402, a product number 403, a product type 404, a product group number 405, and a status 406. The order number "001" is an ID (IDentifier) that is defined in order to uniquely identify an order between the client 1 and the order management apparatus 2, and it is used as a common number by the client 1 and the order management apparatus 2. Product number 403 is an ID for uniquely identifying a product included in the order. Note that in the present example, for the sake of convenience in the description, an example will be given in which one order is placed for one product, but depending on the type of the print ordering service, a service by which it is possible to place one order for multiple products is also envisioned. In such a case, multiple product numbers may be included in one order number.

Product type 404 indicates the type of the product that is to be manufactured with respect to the product. "Perfect binding_8×8" in the present example indicates an 8-inch tall×8-inch wide product having perfect binding, and an order of this type is placed using the order numbers "0001" and "0004". On the other hand, "two-fold pasted page_8× 12" indicates an 8-inch tall×12-inch wide two-fold pasted page product, examples of which are in a state of being ordered using the order numbers "0002" and "0003".

Product group number 405 designates the same product group for orders in which product type 404 is the same, and it is a number issued by the manufacturing sequence management unit 9. In the case of FIG. 4, it is a state before the manufacturing sequence is rearranged in the manufacturing sequence management unit 9, and therefore the column is empty, which indicates that numbers have not yet been issued. Status 406 indicates the manufacturing status of the orders indicated by status 350 in FIGS. 3A and 3B, which is one of the following: pre-manufacturing, manufacturing (press), manufacturing (post-press), manufacturing complete, inspection complete, shipment complete. In the case shown in FIG. 4, the order numbers "0001" to "0004" all indicate pre-manufacturing.

Step information 407 includes part job (step) 408 indicating a breakdown of press steps, job issuance destination 409, and step line 410 for the post-press step. Here, step information 407 is defined in advance as the step information 10 for each type of product that is to be manufactured at the time of designing the production line at the production base, and it is information managed by the step management unit 7. In the present example, with the manufacturing of the "perfect binding_8×8" product having the order number "0001", cover print job 1 is issued to a first cover printer and body print job 1 is issued to a first body printer as the press steps. Furthermore, it is necessary to issue case binding job 1 to a first case binder.

Here, the "1" in cover print job 1 in the part jobs indicates that it is a job that includes the content data laid out by the user in order number "0001", and body print job 1 and case binding job 1 also have a similar meaning. Also, the step line for the post-press step indicates that production will be performed using "line B". Here, line B indicates a virtual production line that will be needed for production of the softcover perfect binding product 341 in FIGS. 3A and 3B.

Similarly, with the manufacturing of the "two-fold pasted page_8×12" product having the order number "0002", cover print, job 1 is issued to a first cover printer and body print job 1 is issued to a first body printer as the press steps. Also, the step line for the post-press step indicates that production will be performed using "line A". Thus, the list shown in FIG. 4 shows information being managed in pairs, namely information regarding steps needed for the order numbers "0001" to "0004" and order information. Based on the information in this table, the order information management unit 8 makes a request to the manufacturing sequence management unit 9 to rearrange the manufacturing sequence of the present invention.

Processing for Instructing Start of Manufacturing

An example of a series of processes for rearranging the manufacturing sequence based on the order information and the list of step information shown in FIG. 4 that were transferred by the manufacturing sequence management unit 9 using the order information management unit 8 according to the present invention will be described next with reference to FIG. 5. This flowchart corresponds to the defining of the manufacturing sequence and the manufacturing start instruction (step S303) in the production workflow shown in FIG. 3A.

The order information that is to be sorted is the same as the content that was described using FIG. 4, and order information that has been received up to the present time by the order information management unit 8 is held. Note that the result obtained by rearranging the order information shown in FIG. 4 according to the manufacturing sequence by means of the processing is shown in FIG. 7, and this will be described later. The program for the present flow is stored in the hard disk 23 of the order management apparatus 2, read out to the RAM 22, and executed by the CPU 21. Note that the flowchart shown in FIG. 5 is constituted by processing for configuring the same product group after the order information has been sorted for each product type (steps S501 to S505), and by processing for sorting the same part job (step) type into the same product group (step S506 to S511).

The first half of the processing will be described first. When the processing is started, the manufacturing sequence management unit 9 obtains one order-worth of order information and step information in step S501. In step S502, the manufacturing sequence management unit 9 determines whether or not order information that has already been obtained includes a product type that is the same as the product type obtained in step S501. If the same product type exists (YES in step S502), the manufacturing sequence management unit 9 performs sorting in step S503 such that it is arranged as the next item for the same product type. If the same product type does not exist (NO in step S502), the manufacturing sequence management unit 9 holds the product type obtained in step S501 as a new product type and moves to step S504. The information held here is held as a non-sorting target until the list information in FIG. 4 ends.

In step S504, the manufacturing sequence management unit 9 determines whether or not unprocessed order information exists. If unprocessed order information exists (YES in step S504), steps S501 to S503 are repeated for all order information. As a result, order information is sorted and rearranged such that the product type 404 in FIG. 4 is consecutive for each type. After the processing is complete for all order information (NO in step S504), in step S506, the manufacturing sequence management unit 9 adds the same product group number to each product having the same product type for each consecutive product type 404. This processing is performed in order to make it easier to search for and manage order information and step information in units obtained by the order information management unit 8 grouping the subsequent product types into groups. The description of the first half of the processing ends here.

Steps S506 to S511, which is the latter half of processing for sorting the same part job (step) types in product groups will be described next. In steps S506 to S511, processing is performed consecutively for each constituent product group.

In step S506, the manufacturing sequence management unit 9 obtains one piece of product group information. For example, information belonging to the group having the product group number "00000001" is obtained as one piece of product group information here. In step S507, the manufacturing sequence management unit 9 obtains one part job (step) in a product group. Specifically, two pieces of information, namely information regarding the part job (step) 408 and information regarding the associated job issuance destination 409 in FIG. 4 are obtained. In step S508, the manufacturing sequence management unit 9 determines whether or not the part job (step) obtained in step S507 and the part job (step) of the same type exists in the information that has already been obtained. If a part job of the same type exists (YES in step S508), in step S509, the manufacturing sequence management unit 9 sorts the part job (step) obtained in step S507 such that is arranged as the next item of the part jobs (steps) of the same type. If a part job (step) of the same type does not exist (NO in step S508), the manufacturing sequence management unit 9 holds the part job (step) obtained in step S507 as a new part job (step) and moves to step S510. The information held here is held as a non-sorting target until the all of the part job (step) information in the product group ends.

In step S510, the manufacturing sequence management unit 9 determines whether or not an unprocessed part job (step) exists. If an unprocessed part job exists (YES in step S510), steps S507 to S509 are repeated for all part jobs. If processing for all part jobs is complete (NO In step S510), in step S511, the manufacturing sequence management unit 9 determines whether or not an unprocessed product group exists. If an unprocessed product group exists (YES in step S511), the processing is repeated in steps S506 to S510 for all product groups. If the processing is complete for all product groups (NO in step S511), the present processing flow ends. The description of the latter half of the flow ends here.

The manufacturing sequence definition processing (sequence deciding processing) in FIG. 5 was described above, and the purpose of this is to cause manufacturing jobs for the same product to be consecutive in units of steps by sorting order information by product type and then subsequently sorting the part jobs (steps).

Processing During Re-Printing

An example of a series of processes for performing rearranging in the manufacturing sequence based on the order information and list of step information shown in FIG. 4 in the case where a product that has not passed inspection is to be re-printed in the manufacturing sequence management unit 9 according to the present invention will be described next with reference to FIG. 6. This flowchart is a flowchart of once again carrying out the defining of the manufacturing sequence (step S303) with respect to a product for which a fail determination was made in the inspection (NO in step S327) in the production workflow shown in FIGS. 3A and 3B. Note that the result list in which the products that are to be re-printed have been rearranged in the manufacturing sequence is as shown in FIG. 8, and will be described later. The program for the present flow is stored in the hard disk 23 of the order management apparatus 2, read out to the RAM 22, and executed by the CPU 21.

In step S601, the manufacturing sequence management unit 9 searches the currently-held order information for a product group that has the same product type as the product that is to undergo re-printing. The order information here is the list of the sequence of processing (steps) that is currently decided on, with respect to products other than those that are re-printing targets. If a product group having the same product type is found (YES in step S602), the manufacturing sequence management unit 9 focuses on the status of the orders belonging to the found product group. Specifically, the manufacturing sequence management unit 9 checks status 406 of the order information in FIG. 4 that is held by the order information management unit 8. Then, in step S603, the manufacturing sequence management unit 9 determines whether or not the status of all orders belonging to the found product group are before "manufacturing (press)" (i.e., "pre-manufacturing"). If all of the statuses of the orders are "pre-manufacturing" (YES in step S603), the manufacturing sequence management unit 9 arranges the product that is to be re-printed by inserting the order that is to be re-printed at the end of the found product group. Then, the present processing flow ends.

If a product group having the same product type is not found (NO in step S602), or if the status of all orders belonging to the found product group is not "pre-manufacturing" (NO in step S603), in step S605, the manufacturing sequence management unit 9 arranges the order that is to be re-printed by inserting it at the end of the order information that is currently being held. Then, the present processing flow ends.

As a result, when controlling the manufacturing sequence of products that are to be re-printed, it is possible to prevent the continuity of the product group that is already being manufactured from being unintentionally disrupted.

Description of Processing Results and Effects

Specific examples of results and effects of the above-described processing will be described below.

First Effect

A first effect of the present invention will be described with reference to the order information and list of step information after the manufacturing sequence has been decided on in FIG. 7, obtained by means of manufacturing sequence deciding processing performed by the order management apparatus 2. Here, a description will be given using the first implementation of manufacturing sequence definition processing carried out in step S303 in FIG. 3A.

As shown in FIG. 4, when the manufacturing sequence has not been defined, the order information has not been sorted by product group 404, and it has not been sorted by part job (step) 408. If manufacturing is performed in this state, the sequence in which it is carried out will simply be the order in which the order data is received. Accordingly, in the following steps, the continuity of manufacturing for the same product type and in the same step sequence is not ensured, and the productivity of the production base will deteriorate significantly.

Figure 5:
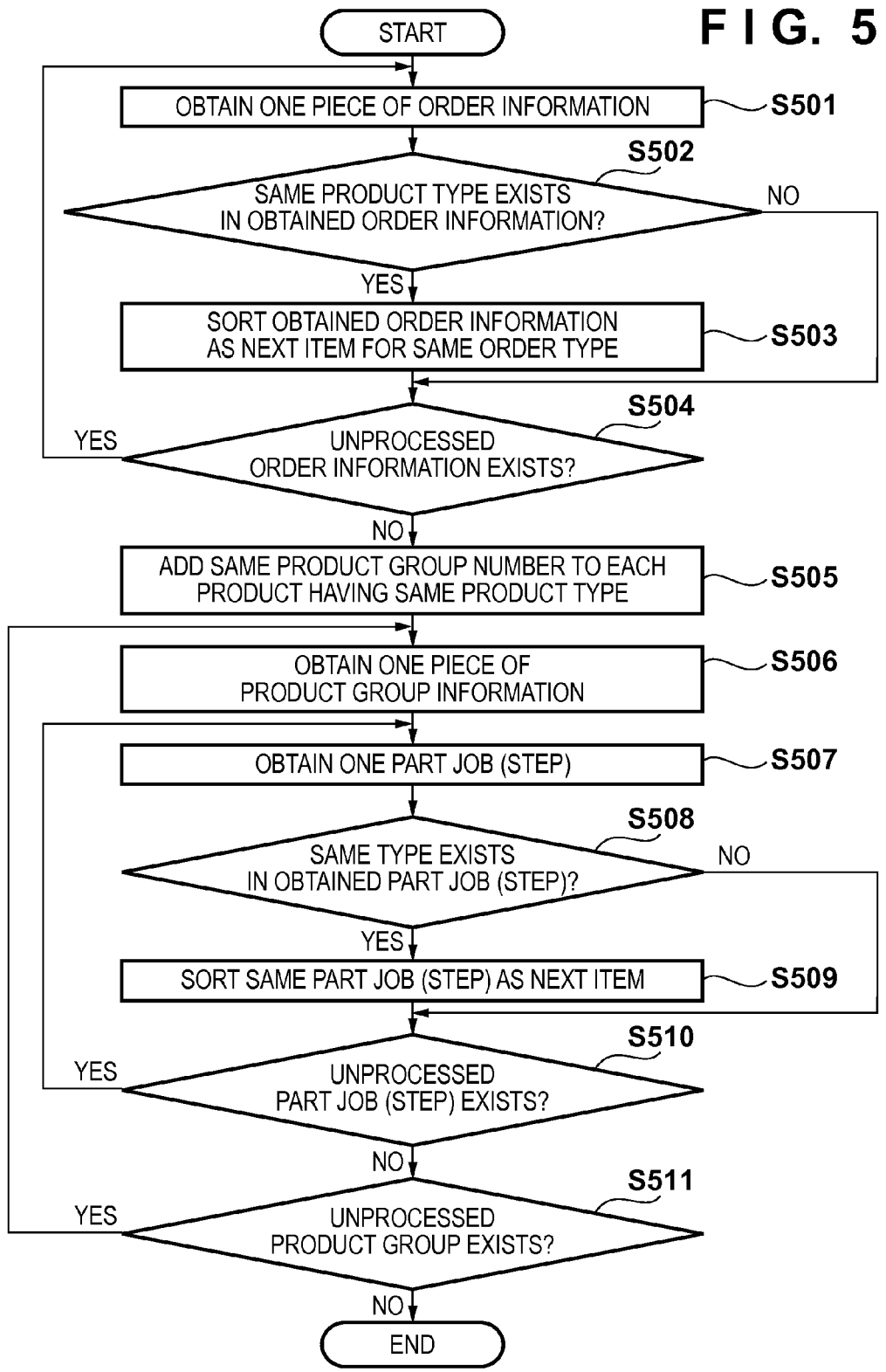
FIG. 5 is a flowchart showing an example of manufacturing sequence deciding processing performed by an order management apparatus.

In response to this, according to the flowchart in FIG. 5, the order information shown in FIG. 4 is first sorted such that the product types are consecutive, and then is sorted according to identical part jobs (steps) in the same product type. As a result, the order information and step information shown in FIG. 4 are sorted like the order Information and step information shown in FIG. 7.

The result shown in FIG. 7 will be used to first give a description focusing on the continuity of the production line obtained by sorting the product types. As for product type 704, the product numbers "0001" to "0004" that have already been received have been sorted into "perfect binding_8×8" and "two-fold pasted page_8×12", which are two product types of product type 704. At the same time, step line 710 for the post-press step is also arranged similarly such that the same step line is consecutive. With the production workflow shown in FIG. 3A, the manufacturing start instruction is to be given subsequently in step S303, and by rearranging the step line in the post-press step as shown in FIG. 7, only one switch from "line B" to "line A" is needed. Thus, in the post-press step, the continuity of post-press steps for the same product type can be ensured. For this reason, according to the present invention, the above-described problem in the post-press step can be resolved.

A description will be given next focusing on the continuity of the same part job (step) 708 in the press step. In FIG. 7, regarding part job 708 and job issuance destination 709, in job issuance destination 709, a "perfect binding_8×8" cover printing job 1 having the content data with the product number "0001" is first issued to the first cover printer. A "perfect binding_8×8" cover print job for the product number "0004" is next issued thereto. Thus, print jobs of the same product type and the same part type are consecutive. Here, as described above, print settings for print jobs are the same for the same product types, and therefore the continuity of print jobs having the same print setting can be ensured with respect, to one printer. For this reason, the present invention resolves the above-mentioned problem-to-be-solved in the press step.

By implementing the steps in accordance with the manufacturing sequence obtained by the present invention in the description above, the continuity of print jobs having the same conditions can be ensured in the press step, and there is no need to exchange paper supply rolls or to switch paper supply roll positions for each print job for a part. As a result, an improvement in print, efficiency per unit time can be expected based on the fact that consecutive printing can be implemented.

Also, in the post-press step, an improvement in productivity per unit time can be expected since the continuity of post-press steps having the same product type can be ensured. Also, in the inspection step, an improvement in productivity in the inspection step per unit time can be expected since the continuity of visual inspections of the same product type can be ensured.

Second Effect

A second effect of the present invention will be described with reference to the example shown in FIG. 8, obtained by means of manufacturing sequence deciding processing in the case of re-printing performed by the order management apparatus 2. Here, a description will be given using an example of manufacturing sequence definition processing (step S303) for a product that is to be re-printed in the case where that product is to be re-printed after it has been determined that the product has not passed (NO in step S327).

Current order information 800 shown in FIG. 8 corresponds to an example of a state of the current order information, excluding the product that is to be re-printed when re-printing occurs. Note that for the sake of convenience in the description, the step information shown in FIGS. 4 and 7 is omitted in FIG. 8. At the current time, the current order information 800 is such that the products "001", "002", and "004" are "perfect binding_8×8" products and have the "inspection complete" status. Also, the product "009" is a "single-leaf photograph_4×6" and has a "manufacturing complete" status. The products "005" and "007" are "single-page pasted page_8×12" products and have a "pre-manufacturing" status. The products "003", "008", and "006" are "two-fold pasted page_8×12" products and have a "pre-manufacturing" status.

On the other hand, re-printing target product 808 indicates an example in which a "single-page pasted page_8×12" product, having the product number "020" is to be re-printed. The manufacturing sequence management unit 9 re-defines the manufacturing sequence using the flowchart, in FIG. 6 in order to re-print the product number "020" that is to be re-printed.

In step S601, the manufacturing sequence management unit 9 searches the current order information 800 for product groups having the same product type as "single-page pasted page_8×12", which is the product type of the product number "020". As a result, in product group number 804, the product group number "00000003" is the same "single-page pasted page_8×12", and therefore it is determined that the same product has been found in step S602, and the procedure moves to step S603. In step S603, the statuses of the product group number "00000003" are checked, and it is checked whether or not the status is before "manufacturing (press)". In the present example, the status is "pre-manufacturing", and therefore the procedure moves to step S604, and the product "020" that is to be re-printed is arranged at the end of the product group number "00000003". Specifically, the product 808 is arranged such that it is inserted at position 806.

According to this, the product "020" is arranged such that it is consecutive with the product type "single-page pasted page_8×12", which is in the product group number "00000003", and thus the continuity of the manufacturing sequence for the product types is ensured. On the other hand, although not illustrated, if the product group number "00000003" has a different product type, or if the status is after "manufacturing (press)", the product 808 is arranged at position 807, which is at the end of the manufacturing sequence.

Note that using the step information such as that shown in FIG. 4 and FIG. 7, rearranging may be furthermore performed such that part jobs (steps) of the same type are furthermore consecutive in products of the same type, although this is not shown in FIG. 8.

In the description above, by rearranging the manufacturing start sequence for re-printing in accordance with the manufacturing sequence that was decided on, it is possible to ensure the continuity of print jobs having the same conditions in the press step, and there is no need to exchange paper supply rolls or switch paper supply roll positions for each print job for a part, even if the product is to be reprinted. As a result, an improvement in print efficiency per unit-time can be expected based on the fact that consecutive printing can be implemented.

Also, in the post-press step, when re-printing a re-printing target product, the continuity of the same product type is ensured with respect to products being manufactured, and thereby an improvement in productivity per unit time can be expected since the continuity of post-press steps for the same product type can be ensured. Also, in the inspection step, an improvement in productivity in the inspection step per unit time can be expected since the continuity of visual inspections of the same product, type can be ensured.

Third Effect

Next, regarding the third effect of the present invention, an example of the inspection step that has been optimized due to grouping of the same product types performed by the order management apparatus 2 will be described with reference to FIGS. 9A and 9B. Here, a description will be given using an example of the inspection step that is implemented in step S326 in FIG. 3B and performed by an inspection worker.

The inspection step is a step in which a worker visually checks for page damage and checks the overall bookbinding finish with respect to a product that is in a bound state, which is the completed product, in order to make a pass or fail determination. It is common to check different locations and items with a focus on different points for each product type, and based on the fact that it is a step that requires human intervention, in the interest of efficiency, it is desirable that products with the same consecutive product type have been stocked at the time of starting the step and that a series of inspection steps are performed consecutively.

In the present example, the press step (step S304) and the post-press step (step S309), which are upstream of the inspection step (step S326) in FIG. 3B, are performed after the defining of the manufacturing sequence and the manufacturing start processing (step S303). For this reason, when the inspection step (step S326) is to be performed, as described in the first effect, the continuity of the manufacturing of the products that have been arranged into groups of the same products is ensured. Note that inspection target product group 900 in FIG. 9A indicates a group of inspection target products having the same product type.

A computer 915 in FIG. 9A corresponds to the order management apparatus 2 of the present invention. Also, the inspection management unit 13 and the barcode reader 901, which constitute the computer 915 are connected. In this example, an arbitrary number for managing the product is assigned to a barcode that is rendered on the back cover of a photobook, which is the product, and by reading this barcode using the barcode reader 901, the inspection result of the product is fed back to the order management apparatus 2. Also, in the present example, the product number of the product is printed on each product as a barcode. A reading screen 903 and screens 907 and 911 of the inspection barcode are displayed on a display unit of the computer 915 and aid the input of the inspection result obtained by the inspection worker 902.

An example of a task performed by an inspection worker 902 in the case where the product number "008" has failed the inspection and the other products are processed as passing will be described below as an example.

The inspection worker 902 checks for page damage and checks the state of the overall bookbinding finish with respect to each product in the inspection target product group 900. Products in the inspection target product group 900 that failed the inspection are sorted out next. Next, the barcodes printed on the back covers of the failing products are read using the barcode reader 901. Here, the inspection management-unit 13 that is connected to the barcode reader 901 displays a screen for receiving input of the inspection result for the product that was scanned to the inspection worker via a user interface 15, and prompts the input of the inspection result.

The screen 903 in FIG. 9A is an inspection result input screen, and here, an example is shown in which the barcode for the product number "008" has been read using the barcode reader 901. Since the inspection worker 902 has recognized that the product number "008" has failed the inspection, he or she presses an inspection fail button 906.

Next, the screen 907 is displayed, and "fail" is displayed for the product number "008" in a product result input box 908, in accordance with the result designated in a screen 903. Next, since the inspection worker 902 has recognized that the other products have passed inspection, he or she presses an all OK button 909 for the boxes of the products in the same product group. As a result of this, as shown in a screen 911, the products belonging to the product group number "00000003", which is the same as that of the non-passing product "008", are all displayed as "OK". Thereafter, the inspection worker 902 ends the inspection processing.

The present example has described an example of a case in which only the product "008" fails. As another example, an inspection OK button 905 (or the inspection fail button 906) is designated on the screen 903 in the case where all of the products belonging to the product group number "00000003" pass (or fail). Subsequently, the all OK button 909 (or an all fail button 910) is pressed in the screen 907. According to this, the results shown in the screen 911 are obtained, and it is also possible to input the inspection results of all products in the same group at one time.

According to the above description, by sorting the order for the same product type in the present invention (steps S501 to S505 in FIG. 5) and adding the same product group number to products having the same product type (steps S506 to S511), it is possible to implement the input of the inspection result at a later inspection step in units of the same product groups. Furthermore, an effect of being able to perform inspection with minimal input is obtained. Specifically, it is also possible to input the result in units of product groups without inputting using a screen, a barcode reader, and the like for each inspection result of every product.

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2013-113170, filed May 29, 2013, which is hereby incorporated by reference herein in its entirety.

What is claimed is:

1. An information processing apparatus comprising:
   an obtaining unit configured to obtain type information of a plurality of products to be manufactured using a print apparatus and a post-pressing apparatus;
   a sequence deciding unit configured to decide on a sequence for manufacturing the plurality of products using the type information of the plurality of products; and
   a control unit configured to cause the print apparatus and the post-pressing apparatus to manufacture the plurality of products in accordance with the sequence decided on by the sequence deciding unit,
   wherein a plurality of steps for product manufacturing are different for each type of product, and
   the sequence deciding unit decides on the sequence such that products of the same type are manufactured consecutively by the print apparatus and the post-pressing apparatus, and furthermore, for each type of product, the sequence deciding unit decides on the sequence using step information regarding a plurality of steps for product manufacturing such that, among steps for manufacturing a plurality of parts that constitute each of the plurality of products of the same type that are consecutive in the print apparatus, steps for manufacturing the same type of part are consecutive.

2. The information processing apparatus according to claim 1, further comprising:
   a managing unit configured to receive and manage an inspection result for a product manufactured by the print apparatus and the post-pressing apparatus,
   wherein when the inspection result for the product is received, the managing unit enables collective input of the inspection result regarding other products of the same type that were manufactured consecutively with the product based on the sequence decided on by the sequence deciding unit.

3. The information processing apparatus according to claim 1,
   wherein if a product that has been manufactured is to be manufactured once again, the sequence deciding unit decides on a sequence for manufacturing the product that is to be manufactured once again, such that products of the same type or parts of the same type are manufactured consecutively, with respect to the currently-decided sequence of performing the plurality of steps for manufacturing another product.

4. A method for an information processing apparatus, comprising:

obtaining type information of a plurality of products to be manufactured using a print apparatus and a post-pressing apparatus;

deciding on a sequence for manufacturing the plurality of products using the type information of the plurality of products; and causing the print apparatus and the post-pressing apparatus to manufacture the plurality of products in accordance with the sequence decided on in the deciding step, wherein a plurality of steps for product manufacturing are different for each type of product, and in the deciding step, the sequence is decided on such that products of the same type are manufactured consecutively by the print apparatus and the post-pressing apparatus, and the sequence is furthermore decided on for each type of product using step information regarding a plurality of steps for product manufacturing such that, among steps for manufacturing a plurality of parts that constitute each of the plurality of products of the same type that are consecutive in the print apparatus, steps for manufacturing the same type of part are consecutive.

5. The method according to claim 4, further comprising:

receiving and managing an inspection result for a product manufactured by the print apparatus and the post-pressing apparatus, wherein in the managing step, when the inspection result for the product is received, collective input of the inspection result regarding the other products of the same type that were manufactured consecutively with the product based on the sequence decided on in the deciding step is enabled.

6. The method according to claim 4, wherein in the sequence deciding step, if a product that has been manufactured is to be manufactured once again, the sequence for manufacturing the product that is to be manufactured once again is decided on such that products of the same type or parts of the same type are manufactured consecutively, with respect to the currently-decided sequence of performing the plurality of steps for manufacturing the other products.

7. A non-transitory computer-readable medium storing a program for causing a computer to function as:

an obtaining unit configured to obtain type information of a plurality of products manufactured using a print apparatus and a post-pressing apparatus;

a sequence deciding unit configured to decide on a sequence for manufacturing the plurality of products using the type information of the plurality of products; and a control unit configured to cause the print apparatus and the post-pressing apparatus to manufacture the plurality of products in accordance with the sequence decided on by the sequence deciding unit, wherein a plurality of steps for product manufacturing are different for each type of product, and the sequence deciding unit decides on the sequence such that products of the same type are manufactured consecutively by the print apparatus and the post-pressing apparatus, and furthermore, for each type of product, the sequence deciding unit decides on the sequence using step information regarding a plurality of steps for product manufacturing such that, among steps for manufacturing a plurality of parts that constitute each of the plurality of products of the same type that are consecutive in the print apparatus, steps for manufacturing the same type of part are consecutive.

\* \* \* \* \*